United States Patent [19]
Rivers et al.

[11] Patent Number: 5,993,999
[45] Date of Patent: Nov. 30, 1999

[54] MULTI-LAYER CURRENT COLLECTOR

[75] Inventors: Miranda Rivers, Atlanta; Lawrence A. Tinker, Woodstock, both of Ga.

[73] Assignee: AER Energy Resources, Inc., Smyrna, Ga.

[21] Appl. No.: 09/079,532

[22] Filed: May 15, 1998

[51] Int. Cl.[6] ................................................. H01M 4/74
[52] U.S. Cl. ........................ 429/244; 429/229; 429/231; 429/233; 429/241; 429/242; 429/245; 429/27; 429/34; 429/59
[58] Field of Search ................................. 429/27, 34, 59, 429/229, 231, 233, 241, 242, 244, 245

[56] References Cited

U.S. PATENT DOCUMENTS

| | | | |
|---|---|---|---|
| 685,797 | 11/1901 | Ricks . | |
| 2,594,709 | 4/1952 | André | 136/30 |
| 2,594,711 | 4/1952 | André | 136/6 |
| 2,867,678 | 1/1959 | Doyen | 136/71 |
| 3,099,899 | 8/1963 | Horn et al. | 50/500 |
| 3,425,871 | 2/1969 | Berger | 136/6 |
| 3,923,544 | 12/1975 | Berchielli | 136/30 |
| 4,091,184 | 5/1978 | Erisman et al. | 429/139 |
| 4,292,357 | 9/1981 | Erisman et al. | 428/124 |
| 4,528,670 | 7/1985 | Findl | 429/38 |
| 4,957,826 | 9/1990 | Cheiky | 429/27 |
| 5,240,785 | 8/1993 | Okamura et al. | 429/27 |
| 5,288,562 | 2/1994 | Taniguchi et al. | 429/32 |
| 5,439,760 | 8/1995 | Howard et al. | 429/94 |
| 5,447,806 | 9/1995 | Hoge et al. | 429/246 |
| 5,462,816 | 10/1995 | Okamura et al. | 429/18 |
| 5,476,730 | 12/1995 | Okamura et al. | 429/27 |
| 5,476,734 | 12/1995 | Pulley et al. | 429/244 |
| 5,525,441 | 6/1996 | Reddy et al. | 429/127 |
| 5,532,087 | 7/1996 | Nerz et al. | 429/248 |
| 5,569,551 | 10/1996 | Pedicini et al. | 429/27 |
| 5,599,637 | 2/1997 | Pecherer et al. | 429/27 |
| 5,639,568 | 6/1997 | Pedicini et al. | 429/27 |
| 5,650,241 | 7/1997 | McGee | 429/67 |
| 5,712,060 | 1/1998 | Grigorieva et al. | 429/206 |

*Primary Examiner*—Bruce F. Bell
*Attorney, Agent, or Firm*—Jones & Askew, LLP

[57] ABSTRACT

A current collector for an electrode with two halves. The current collector has a first layer positioned on the first half of the electrode, a second layer positioned on the second half of said electrode, and a third layer positioned between the first and the second halves of the electrode.

20 Claims, 3 Drawing Sheets

MULTI-LAYER CURRENT COLLECTOR

TECHNICAL FIELD

The present invention relates to metal-air battery cells and more particularly relates to a multi-layer current collector for use in metal-air battery cells.

BACKGROUND OF THE INVENTION

Metal-air battery cells have wide applicability to portable electronic equipment, such as lap-top computers, video cameras, and other types of hand-held devices. Metal-air battery cells provide relatively high power output with relatively low weight as compared to other types of electrochemical cells. These power and weight advantages are due in part to the fact that metal-air cells utilize oxygen from the ambient air as a reactant in the electrochemical process rather than a heavier material such as a metal or metallic composition.

Generally described, a metal-air cell, such as a zinc-air cell, uses one or more air permeable cathodes separated from a metallic anode by an aqueous electrolyte. During operation, oxygen from the ambient air is converted at the cathode to produce hydroxide ions while zinc is oxidized at the anode to react with the hydroxide ions. Water and electrons are released in this reaction to provide electrical energy. On recharge, voltage is applied between the anode and the cathode of the cell and the electrochemical reaction is reversed. Oxygen is discharged back to the atmosphere through the air permeable cathode and hydrogen is vented out of the cell.

High power output from metal-air cells has been accomplished through the use of a dual cathode or a dual air electrode cells. An example of such a dual air electrode cell is found in commonly-owned U.S. Pat. No. 5,569,551 which describes a metal anode, multiple layers of separator materials with liquid electrolyte substantially trapped therein, an upper and lower cathode, an upper and lower mask wall, side walls, and side vents. A further development is shown in commonly-owned U.S. Pat. No. 5,639,568 entitled "Split Anode for a Dual Air Electrode Cell." This patent describes a metal anode for a dual air electrode cell that has upper and lower metal anode layers and either a foil current collector therebetween or a two layer current collector with means for inhibiting zinc movement positioned between the two current collector layers. This design is effective in eliminating or reducing "slumping", i.e., the migration of zinc from one layer to another. Slumping may contribute to capacity loss, operating voltage loss, and may cause an imbalance in current distribution between the cathodes.

A drawback with the current design of metal-air cells is that the cells tend to lose power capability during storage, particularly start-up power. This problem may be due to the manner in which the zinc anode operates while being cycled. During discharge, the zinc discharges from the outside interface with the cathode back towards the current collector. As the anode discharges, zinc is converted to zinc oxide such that the zinc oxide forms from the cathode interface towards the current collector. On recharge, the bulk of the zinc electrode also charges from the cathode interface on the outside back towards the current collector, i.e., the bulk of the zinc forms from the cathode interface towards the current collector.

This pattern may create the situation in which the anode, if not fully charged, has a layer of zinc oxide between the charged zinc at the interface with the cathode and the current collector. In other words, the current collector is not in sufficient contact with the metal zinc to provide minimum power. The zinc oxide layer apparently somehow passivates during storage. This passivation may be due to a change in the morphology of the zinc oxide or by the zinc oxide forming over any metal zinc bridges to the current collector. Passivation leads to a higher resistance in the anode and creates a power loss for the cell as a whole. This problem is particularly of concern at start-up. Although metal-air cells tend to have a power dip for the first several minutes after start-up and before the cell achieves its rated voltage, the power loss problem becomes more acute after the cell has been in storage for a given length of time.

There is a need, therefore, for a metal-air cell that avoids passivation and, more particularly, limits the loss of power at start-up. Such a design would limit the loss of power at start-up so as to provide a more reliable cell. These goals must be accomplished in a cell that remains light-weight and relatively inexpensive for wide spread consumer use in any type of portable electronic device.

SUMMARY OF THE INVENTION

The present invention provides a current collector for an electrode with two halves. The current collector has a first layer positioned on the first half of the electrode, a second layer positioned on the second half of said electrode, and a third layer positioned between the first and the second halves of the electrode.

Specific embodiments include using silver expanded metal for the first and the second current collector layers. The third current collector layer can be either a silver foil or silver expanded metal. The silver expanded metal has an open area of about sixty to eighty percent. The current collector layers also include an anode tab. The anode tab is electrically connected with the current collector layers.

The electrode is used in a metal-air cell with an air cathode positioned on both sides of the electrode. The electrode has a first half and a second half with the halves divided along a central axis. The electrode is generally made of metal zinc such that the metal zinc discharges from the air cathodes towards the central axis and also charges from the air cathodes towards the central axis. By encapsulating the electrode halves with the multiple current collector layers, a current collector is always in electrical contact with the metal zinc.

The present invention provides means for maintaining electrical contact with the metal zinc of the electrode during both discharge and charge. The means includes a current collector for encapsulating the electrode. Specifically, a first current collector layer is positioned on the first half of electrode and a second current collector layer is positioned on the second half of the electrode. The means may further have a third current collector layer positioned between the halves of the electrode. The first and the second current collector layers may be made of silver expanded metal. The third current collector layer may be made of silver foil or silver expanded metal. An absorbent layer also may be positioned between the halves of the electrode. The absorbent layer may be a porous polypropylene material or similar material.

It is thus an object of the present invention to provide a multi-layer current collector.

It is a further object of the present invention to provide an anode with a current collector that limits power loss on start-up.

It is another object of the present invention to provide an anode with a current collector that limits power loss during storage.

It is yet another object of the present invention to provide a current collector that limits slumping.

It is still another object of the present invention to provide increased cycling life.

Other objects, features, advantages of the present invention will become apparent upon review of the following detailed description of the preferred embodiments of the invention, when taken in conjunction with the drawings and the claims.

DETAILED DESCRIPTION OF THE INVENTION

Figure 1:
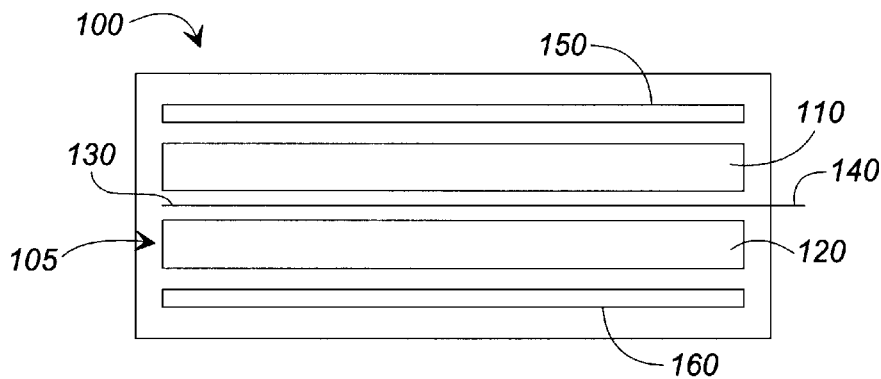
FIG. 1 shows a diagrammatic view of a prior art metal-air cell with a split anode.

Referring now to the drawings in which like numerals indicate like elements throughout the several views, FIG. 1 shows a prior art metal-air cell 100. The metal-air cell 100 has a split anode 105 with an upper anode layer 110, a lower anode layer 120, a current collector 130, an anode tab 140, an upper cathode 150, and a lower cathode 160. All of these elements are positioned within a cell casing 170. The upper anode layer 110 and the lower anode layer 120 are made of zinc expanded metal. By "expanded metal", we mean that the zinc is in the form of a porous screen or a lattice. The current collector 140 is a layer of silver foil. This metal-air cell 100 with the split anode 105 and the silver foil current collector 140 is shown in commonly-owned U.S. Pat. No. 5,639,569, and is incorporated herein by reference. The dual air electrode cell of commonly-owned U.S. Pat. No. 5,569,551, is also incorporated herein by reference. Both of these references describe metal-air cells for use with the present invention.

Figure 2:
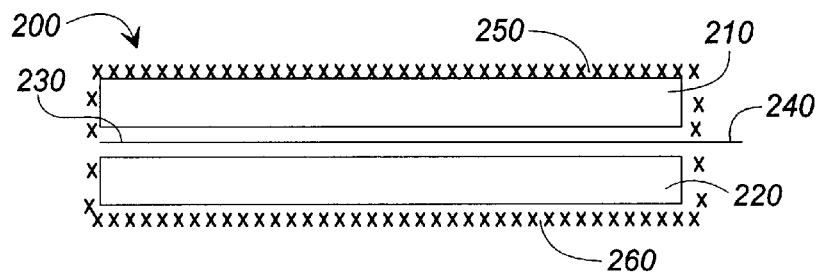
FIG. 2 shows a diagrammatic view of a split anode with silver expanded metal upper and lower current collectors and a silver foil central current collector.

FIGS. 2–5 show various embodiments of the present invention for use with the dual air electrode cell 100, the metal-air cells described in the references incorporated herein, and other types of conventional metal-air cells. The embodiment of FIG. 2 shows an anode 200 having an upper anode layer 210, a lower anode layer 220, and a central current collector 230 with an anode tab 240. The upper anode layer 210 and the lower anode layer 220 are made of zinc expanded metal or similar materials. The central current collector 230 is made of silver foil or similar materials. The upper anode layer 210 is covered with an upper current collector 250 while the lower anode layer 220 is covered with a lower current collector 260. The upper current collector 250 and the lower current collector 260 are in electrical contact with the anode tab 240. The central current collector 230, the upper current collector 250, and the lower current collector 260 encapsulate the anode layers 210, 220 to ensure an electrical connection therebetween. The upper current collector 250 and the lower current collector 260 are made of silver expanded metal or similar materials.

Figure 3:
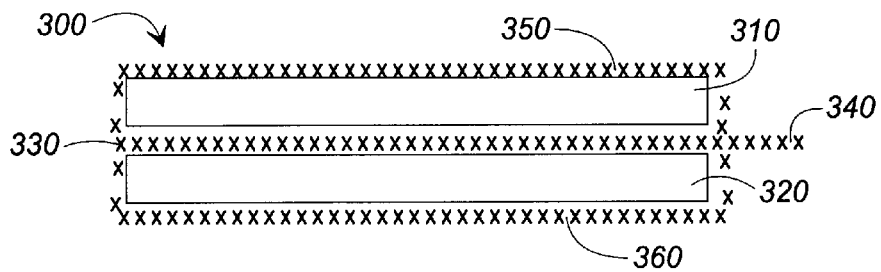
FIG. 3 shows a diagrammatic view of a split anode with silver expanded metal upper, lower, and central current collectors.

A further embodiment is shown in FIG. 3. FIG. 3 shows an anode 300 having an upper anode layer 310, a lower anode layer 320, and a central current collector 330 with a anode tab 340. The upper anode layer 310 and the lower anode layer 320 are made of zinc expanded metal or similar materials. The central current collector 330 is made of silver expanded metal or similar materials. The upper anode layer 310 is covered with an upper current collector 350 while the lower anode layer 320 is covered with a lower current collector 360. The upper current collector 350 and the lower current collector 360 are in electrical contact with the anode tab 340. The central current collector 330, the upper current collector 350 and the lower current collector 360 encapsulate the anode layers 310, 320 to ensure an electrical connection therebetween. The upper current collector 350 and the lower current collector 360 are made of silver expanded metal or similar materials.

Figure 4:
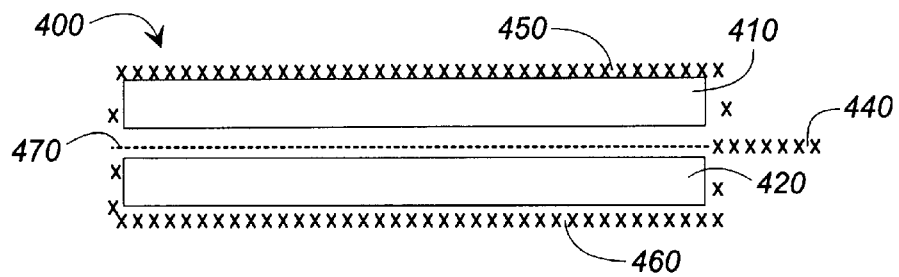
FIG. 4 shows a diagrammatic view of a split anode with silver expanded metal upper and lower current collectors and an absorbent layer positioned between the anode layers.

A further embodiment is shown in FIG. 4. FIG. 4 shows an anode 400 having an upper anode layer 410, a lower anode layer 420, and a anode tab 440. The upper anode layer 410 and the lower anode layer 420 are made of zinc expanded metal or similar materials. The upper anode layer 410 is covered with an upper current collector 450 while the lower anode layer 420 is covered with a lower current collector 460. The upper current collector 450 and the lower current collector 460 encapsulate the anode layers 410, 420 to ensure an electrical connection therebetween and also form the anode tab 440. The anode tab 440, the upper current collector 450 and the lower current collector 460 are made of silver expanded metal or similar materials. Positioned between the upper anode layer 410 and the lower anode layer 420 is an absorbent layer 470 made of a porous polypropylene absorbent material or similar types of materials. An example of a porous polypropylene absorbent material is the "141-035 Polyolefin" material sold by the Veratec Division of International Paper Corporation of Walpole, Mass. with a KOH absorbency of about 450%. The absorbent layer 470 acts as an electrolyte reservoir between the respective anode layers 410, 420.

Figure 5:
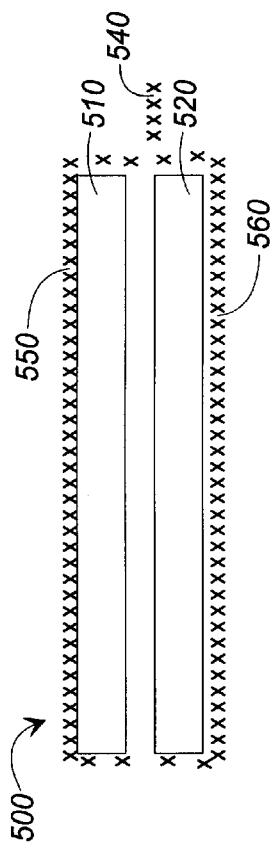
FIG. 5 shows a diagrammatic view of a split anode with silver expanded metal upper and lower current collectors.

A further embodiment is shown in FIG. 5. FIG. 5 shows an anode 500 having an upper anode layer 510, a lower anode layer 520, and a anode tab 540. The upper anode layer 510 and the lower anode layer 520 are made of zinc expanded metal or similar materials. The upper anode layer 510 is covered with an upper current collector 550 while the lower anode layer 520 is covered with a lower current collector 560. The upper current collector 550 and the lower current collector 560 encapsulate the anode layers 510, 520 to ensure an electrical connection therebetween and also form the anode tab 540. The anode tab 540, the upper current collector 550, and the lower current collector 560 are made of silver expanded metal or similar materials. In this embodiment, nothing is positioned between the upper anode layer 510 and the lower anode layer 520.

The embodiment of FIG. 2 is presently considered to be the preferred embodiment. By surrounding the anode layers 210, 220 with the three (3) current collector layers, i.e., the central current collector 240, the upper current collector 250, and the lower current collector 260, a continuous electrical connection with the metal of the anode layers 210, 220 is provided. When the anode layers 210, 220 are fully charged, all three current collectors 240, 250, 260, will be in contact with the zinc metal of the anode layers 210, 220. As the anode layers 210, 220 discharge, and zinc oxide is formed from the interface with the cathodes 150, 160 back towards the central current collector 240, the central current collector 240 will be in contact with the metal zinc until the anode layers 210, 220 are completely discharged. During charging, the upper current collector 250 and the lower current collector 260 will be in contact with the zinc metal as the anode layers 210, 220 again charge from the interface with the cathodes 150, 160 back towards the central current collector 240. In sum, one of the current collectors 240, 250, 260 will be in contact with zinc metal at all times other than when the anode layers 210, 220 are completely discharged.

In each of the embodiments shown in FIGS. 2–5, the upper current collectors 250, 350, 450, 550 and the lower current collectors 260, 360, 460, 560 are made of silver expanded metal. Expanded metal is preferred over other types of metal, e.g., a foil or other type of solid, because of its porous nature. The expanded metal allows oxygen and electrolyte to pass through the current collector so as to permit discharge of the anode layers. To avoid areas of undischarged zinc on the upper anode layers 210, 310, 410, 510 and the lower anode layers 220, 320, 420, 520 because of insufficient access, silver expanded metal with an open area of about sixty to about eighty percent is preferred.

The embodiment of FIG. 2 is also preferred at this time because of the use of the silver foil current collector 230. As is described in commonly owned U.S. Pat. No. 5,369,568, described above, the silver foil prevents zinc migration or slumping between the anode layers 210, 220. The use of the silver expanded metal current collector 330 of FIG. 3, the absorbent layer 470 of FIG. 4, or no central current collector at all as is found in FIG. 5, do not limit slumping between the respective anode layers 210, 220.

Numerous tests have been performed to compare the operation of the prior art anode of FIG. 1 with the embodiments disclosed herein. These tests include formation and initial power tests to determine the average discharge voltage, power and cycle life tests over various storage times, and start-up power tests after various storage times. The start-up power tests show the most significant improvement in cell performance over the anode of FIG. 1.

Figure 6:
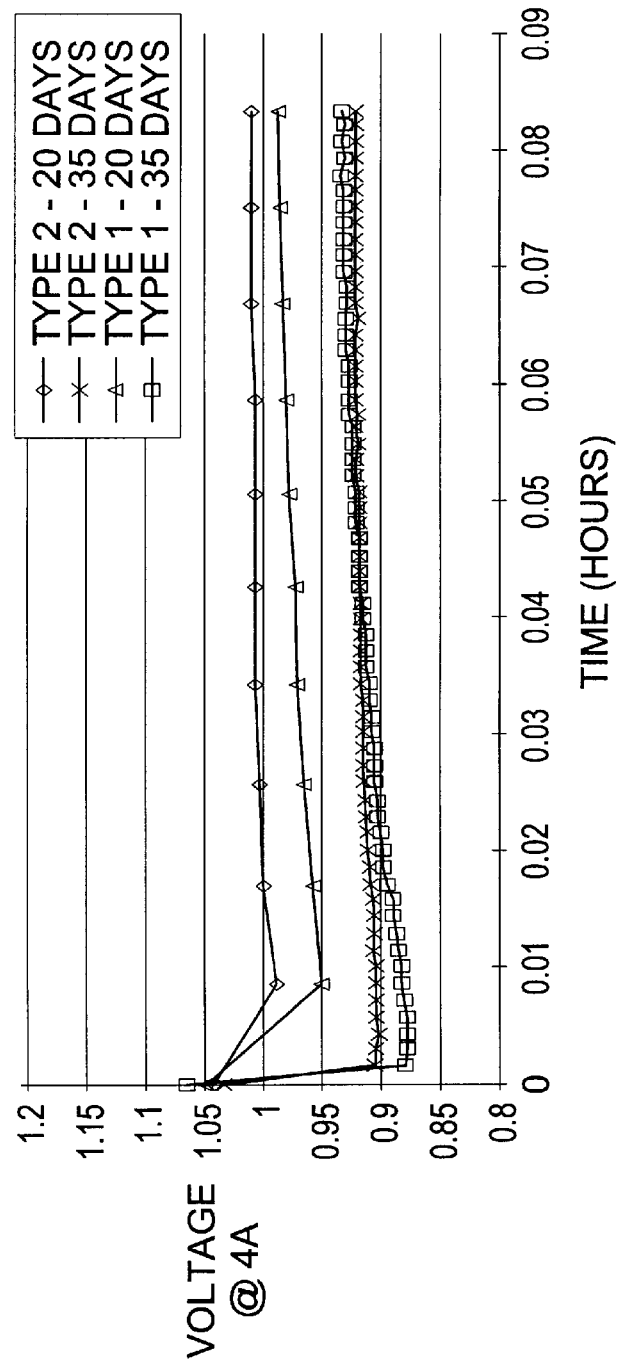
FIG. 6 is a chart showing start-up power for various anode embodiments at 75% recharge.
Figure 7:
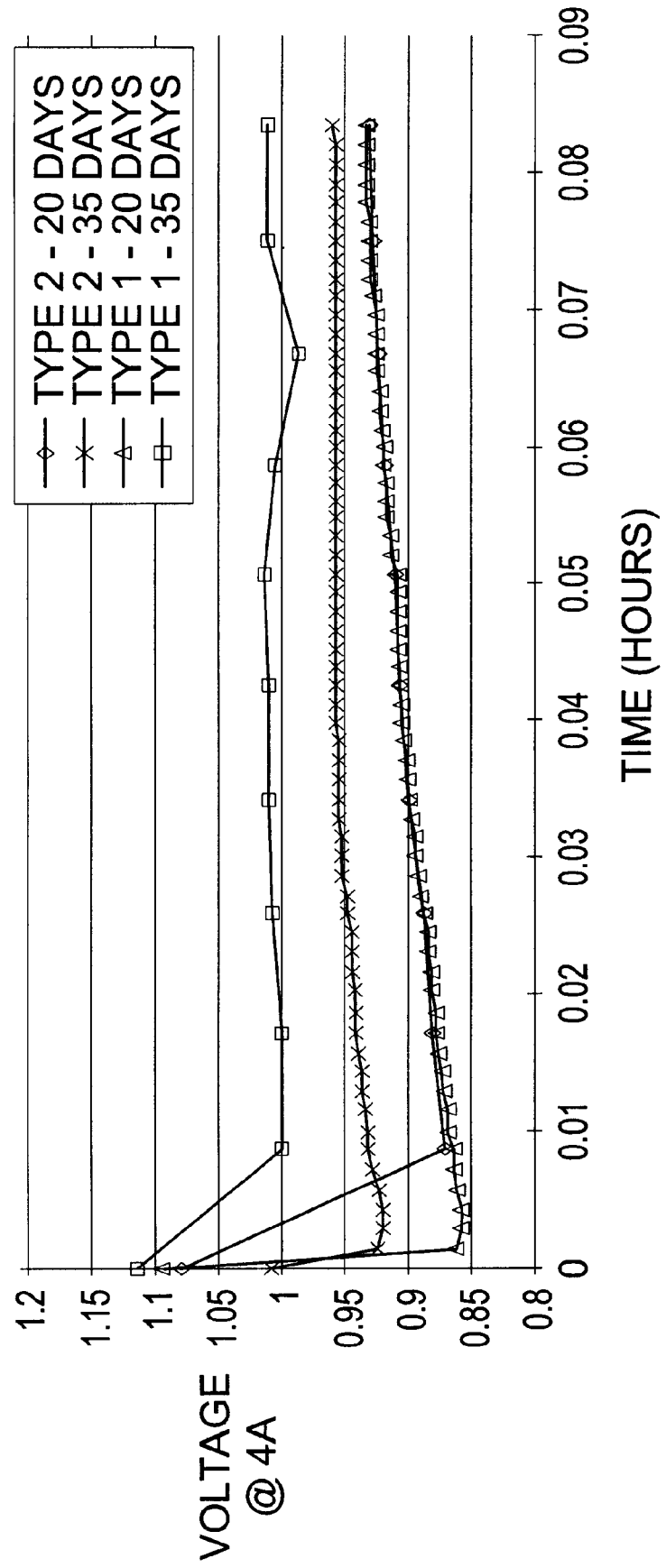
FIG. 7 is a chart showing start-up power for various anode embodiments at 90% recharge.

As is shown in FIGS. 6 and 7, start-up power for the type 1 cells, i.e., the anode of FIG. 1, was compared to the start-up power of the type 2 cells, i.e., the anode of FIG. 2. The cells were tested with storage times of twenty (20) days and thirty five (35) days at both 75% recharge in FIG. 6 and 90% recharge in FIG. 7. As was described above, metal-air cells commonly have a power dip at start-up before the cells reach their rated voltage. This power loss was minimized somewhat by the anode of FIG. 2 in the 75% recharged formation shown in FIG. 6 and significantly reduced in the 90% recharged formation shown in FIG. 7. A 70–120 millivolt advantage in start-up power is obtained by the anode 200 of FIG. 2. Such a reduction in start-up power loss results in a significantly more reliable battery cell. In sum, the anode 200 of FIG. 2 of the present invention provides both improved start-up power and reduced zinc migration as compared to typical metal anodes.

Please note that the terms "upper" and "lower" are used herein to define a relative frame of reference for convenience and do not require any particular orientation of the anode 200, 300, 400, 500 as a whole.

The foregoing relates only to the preferred embodiments of the present invention, and many changes may be made therein without departing from the scope of the invention as defined by the following claims.

We claim:

1. A current collector for an electrode, with said electrode comprising a first and a second half and with each said half comprising a first side and a second side, said current collector comprising:

a first current collector layer positioned on said first side of said first half of said electrode;

a second current collector layer positioned on said second side of said second half of said electrode; and a third current collector layer positioned between said first and said second halves of said electrode.

2. The current collector of claim 1, wherein said first and said second current collector layers comprise silver expanded metal.

3. The current collector of claim 2, wherein said first and said second current collector layers comprise silver expanded metal with an open area of about sixty to eighty percent.

4. The current collector of claim 1, wherein said third current collector layer comprises silver foil.

5. The current collector of claim 1, wherein said third current collector layer comprises silver expanded metal.

6. The current collector of claim 1, wherein said current collector layers each comprise a first end and a second end and wherein said first ends of said current collector layers comprise an anode tab.

7. The current collector of claim 1, further comprising an anode tab.

8. The current collector of claim 7, wherein said anode tab is electrically connected to said current collector layers.

9. An electrode for a metal-air cell, comprising:

a zinc metal electrode comprising a first half and a second half;

a central current collector positioned between said first and said second halves of said zinc metal electrode;

said central current collector comprising silver foil;

an upper current collector positioned on said first half of said zinc metal electrode; and a lower current collector positioned on said second half of said zinc metal electrode;

said first and said second current collectors comprising silver expanded metal.

10. An anode for a metal-air cell, said metal air cell comprising an air cathode positioned on both sides of said anode, said anode comprising:

an electrode comprising a first half and a second half, said halves of said electrode divided along a central axis;

said electrode further comprising metal zinc such that said metal zinc discharges from said air cathodes towards said central axis and charges from said air cathodes towards said central axis; and means for maintaining electrical contact with said metal zinc of said electrode during both discharge and charge.

11. The anode of claim 10, wherein said means for maintaining electrical contact with said metal zinc comprises a current collector encapsulating said electrode.

12. The anode of claim 10, wherein said means for maintaining electrical contact with said metal zinc comprises a first current collector layer positioned on said first half of electrode and a second current collector layer positioned on said second half of said electrode.

13. The anode of claim 12, wherein said means for maintaining electrical contact with said metal zinc further comprises a third current collector layer positioned between said first and said second halves of said electrode.

14. The anode of claim 13, wherein said third current collector layer comprises silver foil.

15. The anode of claim 13, wherein said third current collector layer comprises silver expanded metal.

16. The anode of claim 12, wherein first and said second current collector layers comprise silver expanded metal.

17. The anode of claim 16, wherein first and said second current collector layers comprise silver expanded metal with an open area of about sixty to eighty percent.

18. The anode of claim 10, further comprising an absorbent layer positioned between said first and said second halves of said electrode.

19. The anode of claim 18, wherein said absorbent layer comprises porous polypropylene.

20. The anode of claim 10, further comprising an anode tab and wherein said means for maintaining electrical contact with said metal zinc of said electrode is in electrical contact with said anode tab.

* * * * *